United States Patent
Corona Galvan et al.

(10) Patent No.: US 8,987,371 B2
(45) Date of Patent: Mar. 24, 2015

(54) FUNCTIONALIZED MULTI-ARM POLYMERS WHICH COMPRISE FUNCTIONALIZED POLYMERS SYNTHESIZED BY ANIONIC POLYMERIZATION AND THEIR APPLICATIONS

(75) Inventors: Sergio Corona Galvan, Las Rozas (ES); Rafael Polo Abad, Alcobendas-Madrid (ES); Ma Dolores Parellada, Madrid (ES); Alejandro Claudio Esquivel De La Garza, Ciudad Madero (MX)

(73) Assignee: Dynasol Elastomeros, S.A., Madrid (ES)

( * ) Notice: Subject to any disclaimer, the term of this patent is extended or adjusted under 35 U.S.C. 154(b) by 683 days.

(21) Appl. No.: 12/996,060

(22) PCT Filed: Dec. 10, 2009

(86) PCT No.: PCT/ES2009/070572
§ 371 (c)(1),
(2), (4) Date: Dec. 3, 2010

(87) PCT Pub. No.: WO2011/070182
PCT Pub. Date: Jun. 16, 2011

(65) Prior Publication Data
US 2011/0251308 A1 Oct. 13, 2011

(51) Int. Cl.
*C08F 8/00* (2006.01)
*C08F 8/04* (2006.01)

(52) U.S. Cl.
CPC ..... *C08F 8/00* (2013.01); *C08F 8/04* (2013.01)
USPC ......................................................... 524/572

(58) Field of Classification Search
CPC ............... C08F 8/04; C08F 8/12; C08F 12/08
See application file for complete search history.

(56) References Cited

U.S. PATENT DOCUMENTS

| 3,280,084 | A | 10/1966 | Zelinski et al. |
| 3,639,517 | A | 2/1972 | Kitchen et al. |
| 3,949,020 | A | 4/1976 | Prudence |
| 4,970,254 | A | 11/1990 | Willis et al. |
| 5,166,277 | A | 11/1992 | Goodwin et al. |
| 5,393,843 | A | 2/1995 | Handlin, Jr. et al. |
| 5,493,044 | A | 2/1996 | Schwindeman |
| 5,496,898 | A | 3/1996 | Sutherland et al. |
| 5,583,185 | A | 12/1996 | Parellada Ferrer et al. |
| 5,798,418 | A * | 8/1998 | Quirk ............................ 525/314 |
| 5,910,547 | A * | 6/1999 | Schwindeman et al. ... 525/332.8 |
| 5,919,870 | A * | 7/1999 | Letchford et al. ......... 525/333.2 |
| 6,858,679 | B2 * | 2/2005 | Quirk et al. ................... 525/342 |
| 6,891,019 | B2 * | 5/2005 | Brockmann et al. .......... 528/422 |
| 2005/0027071 | A1 | 2/2005 | Deeter et al. |

FOREIGN PATENT DOCUMENTS

WO 9716465 5/1997

OTHER PUBLICATIONS

T.W. Greene and P.G.M. Wuts, Protective Groups in Organic Synthesis, Second edition, Wiley, New York, 1991. p. 41 & p. 80-83.
Anionic Polymerization: Principles and Practical Applications, Hsieh, H.L., Quirk, Roderic P., Marcel Dekker 5 Inc, New York.
Almena et al. "3-Lithiopropyl tert-Butyl Thioether: A New y-Functionalised Organolithium Compound (dJ-Reagent) in Synthetic Organic Chemistry" Terahedron, 1995, vol. 51, No. 43, pp. 11883-11890, Elsevier Sci Ltd, Great Britain.
Roovers et al. "Analysis and Dilute Solution Properties of 12 and 18 Arm Star Polystryrenes" Macromolecules, 1983, 16, 214-220, American Chemical Society.
Toporowski et al. "Synthesis and Properties of Eighteen-arm Polybutadienes" Jour of Poly Sci: Part A, vol. 24, pp. 3009-3019, 1986, John Wiley & Sons, Inc.
Alexakis et al. "Mild Protection and Deprotection of alcohols as ter-butyl ethers in the field of pheromone Synthesis" Tetrahedron Letters vol. 29, No. 24, pp. 2951-2954, 1988, Pergamon Press Plc.
Figadere et al. "A FAcile and Highly Chemoselective Protection of Primary Hydroxyl Groups with 2-Methyl-1-Butene" Tetrahedron Letters, vol. 34, No. 37, pp. 5893-5894, 1993, Pergamon Press.
Quirk et al. "Recent Advances in anionic synthesis of Functionalized elastomers using functionalized alkyllithium initiatiors".

* cited by examiner

*Primary Examiner* — Peter D Mulcahy
(74) *Attorney, Agent, or Firm* — Gardner Groff Greenwald & Villanueva, PC

(57) ABSTRACT

Functionalized multi-arm polymers which comprise the reaction product of a coupling agent and a polymer synthesized by anionic polymerization. Furthermore, the invention relates to their preparation method and their different uses, especially as hot-melt adhesives.

24 Claims, No Drawings ns which come from the reaction between a polymer
FUNCTIONALIZED MULTI-ARM POLYMERS WHICH COMPRISE FUNCTIONALIZED POLYMERS SYNTHESIZED BY ANIONIC POLYMERIZATION AND THEIR APPLICATIONS This application claims priority to PCT International Application No. PCT/ES2009/070572, filed Dec. 10, 2009, which are hereby incorporated herein by reference in their entirety for all purposes.

The present invention relates to functionalized multi-arm polymers which comprise the reaction product of a coupling agent and a polymer synthesized by anionic polymerization, their synthesis processes and their different uses, especially as hot-melt adhesives. Therefore, the present invention belongs to the field of polymers.

STATE OF THE ART

The molecular architecture and, particularly, branching i.e. the introduction of multiple arms chemically bonded to a coupling agent, may have a profound effect on the processability and properties of polymers. The methodology most commonly used to produce multi-arm polymers is anionic polymerization. Although in the literature various coupling agents have been reported to prepare branched polymers, two of the coupling agents most widely used are multifunctional chlorosilanes and divinylbenzene. For example, U.S. Pat. No. 3,280,084 discloses the use of divinylbenzene as coupling agent of polybutadienyl lithium chains. The resulting polymer has a multi-arm structure wherein the centre is formed by polydivinylbenzene, from which the polybutadiene chains emerge. With this methodology it was also possible to synthesize multi-arm polymers wherein the arms were formed by styrene and butadiene copolymers. U.S. Pat. No. 3,639,517 also discloses the use of divinylbenzene to prepare styrene and butadiene multi-arm copolymers, wherein the arms have different molecular weights. The arms were formed using multiple additions of styrene and initiator to form polystyrene blocks of different molecular weight, followed by the addition of butadiene, and finally the coupling of these arms with divinylbenzene to form the multi-arm copolymers. These non-functionalized multi-arm polymers have been used as enhancers of the viscosity index of lubricating oils.

Roovers, Hadjichristidis and Fetters (*Macromolecules*, volume 16, 214 (1983)), and Toporowski and Roovers (*J. Polym. Sci., Part A, Polym. Chem.*, Volume 24, 3009 (1986)) have described a method to prepare multi-arm polymers using multifunctional chlorosilanes. This methodology consists of coupling chains of active polymers with polychlorosilanes, having obtained polyisoprenes, polybutadienes and polystyrenes with 12 or 18 arms by using $Si[CH_2CH_2SiCl_3]_4$ or $[CH_2Si-(CH_2SiCl_3)]_2$, respectively.

Oligomers formed by acrylic monomers (functionalized with at least one ester, carboxylic acid, anhydride or epoxy functional group), copolymerized with styrene, have also been successfully used as coupling agents of polymers obtained anionically to prepare multi-arm polymers (U.S. Pat. No. 7,517,934). Specifically, using n-butyl lithium as initiator, in a first stage poly(styrene-butadiene)lithium copolymers were prepared. In a second stage, a determined quantity of the acrylic oligomer was added to the poly(styrene-butadiene)lithium copolymers in a ratio lower than 1, such that it favoured the coupling of chains. With this methodology it was possible to produce non-functionalized multi-arm polymers containing between 12 and 14 coupled chains.

These non-functionalized multi-arm polymers have been used in applications such as modification of plastics, modification of asphalts, and pressure-sensitive adhesives, among others.

DESCRIPTION OF THE INVENTION

The present invention relates to functionalized multi-arm polymers which come from the reaction between a polymer synthesized by anionic polymerization, from functionalized and protected initiators, of general formula $Li-Q_n-Z-T-(A-R^1R^2R^3)_m$, and a coupling agent which has from 1 to 30 functional groups. The present invention also relates to the polymers obtained by the deprotection of the protective group $(A-R^1R^2R^3)_m$, and to functionalized hydrogenated multi-arm polymers. It also discloses the preparation processes of said polymers as well as their uses, especially in hot-melt adhesive compositions, in modification of plastics and in modification of asphalts. The polymers of the invention have advantages in comparison with those of the state of the art with respect to their mechanical properties, rheological in blends, and of physically or chemically interacting with different substrates. This allows them to be advantageously used in applications such as hot-melt adhesives, in the modification of asphalts and in the impact modification of engineering plastics, among others.

The first aspect to be considered is a functionalized multi-arm polymer which comprises the reaction product of:

(a) a coupling agent with a number of functional groups from 1 to 30, preferably from 5 to 20. Coupling agents are known in the state of the art which are useful for the type of multi-arm polymers obtained in the present invention, such as, for example, an oligomer formed by acrylic monomers (functionalized with at least one ester, carboxylic acid, anhydride or epoxy functional group) copolymerized with styrene (for example, those disclosed in U.S. Pat. No. 7,517,934), or alternatively divinylbenzene (disclosed in U.S. Pat. Nos. 3,280,084 and 3,949,020), or alternatively multifunctional chlorosilanes (Roovers, Hadjichristidis and Fetters (*Macromolecules*, volume 16, 214 (1983)), and Toporowski and Roovers (*J. Polym. Sci., Part A, Polym. Chem.*, Volume 24, 3009 (1986)). The preferred coupling agent is an oligomer obtained by free radical polymerization at least one monomer selected from the group that consists of aromatic vinyl monomers and at least one monomer selected from the group that consists of epoxy-functional acrylic monomers, anhydride-functional acrylic monomers, ester-functional acrylic monomers, carboxylic acid-functional acrylic monomers and any of their mixtures, where the coupling agent has a number average molecular weight from approximately 1,000 to approximately 10,000 g/mol, and an weight average molecular weight from approximately 1,500 to approximately 20,000 g/mol, where the functional groups present in the acrylic monomers are responsible for the coupling reactions;

(b) and a polymer synthesized by anionic polymerization, characterized in that the polymer synthesized by anionic polymerization, also known as anionically polymerized polymers in the context of the present invention, is of formula (I): $Li-Q_n-Z-T-(A-R^1R^2R^3)_m$; where Q are alkenyl aromatic monomers, of conjugated diene or mixtures of them anionically polymerized from Li—Z; Z is a branched or non-branched hydrocarbyl connector group of from 3 to 25 carbon atoms; T is an element selected from the group of oxygen, sulfur and nitrogen; $(A-R^1R^2R^3)$ is a protective group wherein A is an element selected from C or Si; $R^1$, $R^2$, $R^3$ are independently selected from hydrogen, alkyl groups, alkyl groups substituted with $C_1$-$C_5$, $C_1$-$C_5$ thioalkyl, and $C_1$-$C_5$ dialkylamine, aryl or aryl groups substituted with $C_1$-$C_5$, $C_1$-$C_5$ thioalkyl, and $C_1$-$C_5$ dialkylamine, cycloalkyl of between 5 and 12 carbon atoms or cycloalkyl groups of between 5 and 12 carbon atoms substituted with $C_1$-$C_5$ alkyl, $C_1$-$C_5$ thioalkyl, and $C_1$-$C_5$ dialkylamine; m is 1 when T is oxygen or sulfur and 2 when T is nitrogen; n is the number of units of diene monomer, of alkenyl aromatic monomer, or of any of their anionically polymerized blends. In the context of the present invention $C_1$-$C_5$ alkyl is understood as an alkyl chain of 1 to 5 carbon atoms, being linear or branched, preferably linear, examples of such $C_1$-$C_5$ alkyl groups are methyl, ethyl, propyl, butyl and pentyl. Evidently, as is known in the state of the art and as is explained below, so that the coupling reaction takes place between the coupling agent and the polymer synthesized by anionic polymerization, the second should be active, or "alive", totally or partially. These materials are easier to process than the linear ones, also showing less viscosity than a linear one of similar molecular weight. Furthermore, improvements can be observed in rheology, compatibility and polarity of the multi-arm polymers, which gives them advantages such as compatibility with a greater number of substrates. Additionally, its surface activity is improved, making them useful in applications where one wants to improve adhesion, compatibility, miscibility and dispersibility. The functional groups present in the multi-arm polymers can also be used advantageously to alter the surface properties of non-functionalized polymers. When the multi-arm polymers of the present invention are mixed with non-functionalized polymers, the functional groups, of different nature to the non-functionalized polymers, are separated and migrate to the surface of the blend, thus modifying their surface properties.

The second aspect are functionalized multi-arm polymers derived from those of the first aspect, such as the polymer which can be obtained by the deprotection of the protective group $(A-R^1R^2R^3)_m$ present in the functionalized multi-arm polymers, as well as functionalized hydrogenated multi-arm polymers, characterized in that they can be obtained by hydrogenation of any of the polymers defined in the first aspect or those which can be obtained by the deprotection thereof, defined in this second aspect.

The third aspect to consider is a method for the preparation of any of the polymers as defined in the first and second aspects, which comprises making the polymer synthesized by anionic polymerization to react with the coupling agent, in addition to a method for the preparation of a hydrogenated multi-arm polymer of the first aspect, characterized in that it comprises hydrogenating the functionalized multi-arm polymers at a temperature between 25 and 150° C. before eliminating the protective groups.

The fourth aspect is a method for the preparation of the hydrogenated multi-arm polymer of the second aspect, characterized in that it comprises hydrogenating the functionalized multi-arm polymers at a temperature between 25 and 150° C. after eliminating the protective groups.

In addition to having the advantages described in the first and second aspects, the hydrogenated multi-arm polymers of the third and fourth aspects provide the materials with thermal, hydrolytic and ultraviolet radiation stability, essential for applications that require high thermal stability or where the materials are exposed to damp environments or to the atmosphere.

The fifth aspect is a method for the preparation of the deprotected multi-arm polymers as defined in the second aspect, characterized in that the protective groups are eliminated by an acid, such as hydrochloric acid, acetic acid, p-toluenesulfonic acid, Amberlyst® 15 ion exchange resin, generally at the reflux temperature of the solvent of the multi-arm polymers, or by other methods described in T. W. Greene and P. G. M. Wuts, Protective Groups in Organic Synthesis, Second edition, Wiley, New York, 1991.

The sixth aspect is an adhesive composition which contains the functionalized multi-arm polymer according to the first and second aspects, characterized in that the reaction product contains from approximately 0.001 to 5% by weight of coupling agent based on the total quantity of coupling agent and polymer synthesized by anionic polymerization, which were made to react according to the first aspect.

The seventh aspect is a reinforced material or a composite material which comprises the functionalized multi-arm polymer according to any of the first or second aspects, mixed with a reinforcing material or with a material that is going to be reinforced. This reinforced material comprises, but is not limited to, asphalts, adhesives, blends with other plastics and nanomaterials.

The eighth aspect is a modified asphalt which comprises asphalt mixed with the functionalized multi-arm polymer according to any of the first or second aspects. The asphalts which comprise the polymers show good compatibility in the medium and good physical properties.

The ninth aspect is a modified plastic which comprises a plastic mixed with the functionalized multi-arm polymer as defined in any of the first and second aspects, the blend contains from approximately 1 to 40 percent by weight of functionalized multi-arm polymer, based on the total weight of the functionalized multi-arm polymer and the plastic. The polymer improves the physical properties, and in particular impact resistance with respect to the virgin plastic.

DETAILED DESCRIPTION OF THE INVENTION

Below, preferred embodiments to carry out the present invention are described.

Normally, the quantity of reactive polymer chains synthesized by anionic polymerization is much higher in moles than those of the coupling agent, which means that it may be the case that not all are covalently bonded to the coupling agent, although preferably between 1 and 30 chains of the polymer synthesized by anionic polymerization are covalently bonded to the coupling agent.

In a preferred embodiment the functionalized multi-arm polymer of formula Li-$Q_n$-Z-T-$(A-R^1R^2R^3)_m$ described in the first aspect is characterized in that T is oxygen. In another preferred embodiment the functionalized multi-arm polymer of formula Li-$Q_n$-Z-T-$(A-R^1R^2R^3)_m$ described in the first aspect is characterized in that T is nitrogen. These functionalities improve the surface activity and make them useful in applications wherein one wants to improve adhesion, compatibility, miscibility and dispersibility. In another embodiment the functionalized multi-arm polymer of formula Li-$Q_n$-Z-T-$(A-R^1R^2R^3)_m$ described in the first aspect is characterized in that T is sulfur.

The number of necessary protective groups depends on the functionalization introduced. For example, when T is oxygen or sulfur, m is preferably 1 and when T is nitrogen, m is preferably 2.

As has already been commented in the first aspect, Z is a branched or non-branched hydrocarbyl connector group of from 3 to 25 carbon atoms. The Z groups useful for synthesis of the polymers of the invention are known in the state of the art, but preferably Z is propyl, isopropyl, butyl, isobutyl, sec-butyl, tert-butyl, pentyl, isopentyl, neopentyl, tert-pentyl, hexyl, isohexyl, heptyl, octyl, nonyl, decyl, undecyl, dodecyl, tridecyl, tetradecyl, pentadecyl, hexadecyl, heptadecyl or octadecyl.

The $R^1$, $R^2$ and $R^3$ groups together with A form the protective groups. The protective groups of O, N or S are very well known and used in the state of the art. $R^1$, $R^2$ and $R^3$ may be independently selected from methyl, ethyl, propyl, isopropyl, butyl, isobutyl, sec-butyl, tert-butyl, pentyl, isopentyl, neopentyl and tert-pentyl. Normally, carbon-based protective groups are preferred, i.e. when A is carbon (C), because they are usually more easily available and economical, but when Z is oxygen (O) good results have been obtained with silicon-based (Si) protective groups.

The polymers synthesized by anionic polymerization useful for the present invention are known in the state of the art. These polymers synthesized by anionic polymerization can undergo finalization reactions or coupling reactions with the coupling agents. Anionic polymerization is a well-known technique which uses initiators, such as organic initiators of alkaline metals, to polymerize conjugated diolefins or other anionically polymerizable monomers. Anionic polymerization can be carried out in a continuous process, by batches or semicontinuous. The polymers produced by anionic polymerization are commonly called "living polymers", due to the fact that each monomer reaction step creates a carbanion, allowing the polymer to continue growing until the monomers have been totally consumed. The polymers remain active even after the monomers have been exhausted, and they will continue reacting and growing if additional monomer is supplied. A detailed description of the methodology can be found in "Anionic Polymerization: Principles and Practical Applications", Hsieh, H. L., Quirk, Roderic P., Marcel Dekker Inc, New York, 1996, which is incorporated in the present application as reference. Anionic polymerization is a methodology particularly attractive for the production of block copolymers with well-defined structures. The polymers obtained by this route may be radial, linear or branched polymers, depending on the functionalities of the initiators or coupling agents used to prepare them.

Anionic polymerization is typically carried out in non-polar hydrocarbon solvents, at moderate temperatures, in a vacuum or inert atmosphere, using highly purified reagents in order to avoid the premature termination of the initiator or polymerized chains. The polymers may be homopolymers or copolymers, including both random copolymers and block copolymers. The commercial polymers synthesized by anionic polymerization, or anionically polymerized, include thermoplastic, elastomeric and thermoplastic-elastomeric polymers.

The polymers synthesized by anionic polymerization, for use in the present invention, have an average molecular weight at the peak of the distribution of approximately 3,000 g/mol to approximately 400,000 g/mol. This includes polymers synthesized by anionic polymerization which have a molecular weight of approximately 20,000 g/mol to 200,000 g/mol, although the invention is not limited to polymers which fall within these ranges of molecular weight. In the present invention both the molecular weights of the polymers synthesized by anionic polymerization and the molecular weights of the functionalized multi-arm polymers relate to the molecular weight at the peak of the distribution, $M_p$.

Conjugated diolefins (or dienes) appropriate for their use in the preparation of these polymers synthesized by anionic polymerization are known in the state of the art and include, but are not limited to: 1,3-butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and myrcene.

Examples of anionically polymerizable alkenyl aromatic monomers include, but are not limited to: styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methylhexene and mixtures of them, as well as their derivatives of alkyl, cycloalkyl, aryl, and alkylaryl, wherein the total number of carbon atoms in the combined constituents is not generally over 18. Examples of these last compounds include: 3-methylstyrene, 3,5-diethylstyrene, 2-ethyl-4-benzylstyrene, 4-phenylstyrene, 4-p-tolylstyrene, 4-(tert-butyl)-styrene, 2,4-divinyltoluene and 4,5-dimethyl-1-vinylnaphthalene.

Other anionically polymerizable monomers include acrylamides, acrylonitriles, nitrobutene, vinyl isocyanates, anhydrides, methacrylates, acrylates, carbodiimides, lactones, lactames, cyclic siloxanes and ethylene.

Different polymers/copolymers can be obtained from the anionically polymerized monomers which include, but are not limited to: polystyrene, polybutadiene, polyisoprene, polyethers, polyacetals, and polyphenylene oxides. These polymers may be also elastomers and thermoplastic elastomers prepared of block, tapered or random copolymers of styrene (S), butadiene (B) and isoprene (I) of variable sizes and block quantity. The examples of these elastomers and thermoplastic elastomers include the block copolymers SB, SI, SBR, $(SB)_m S$ (wherein m is an integer number), SBS, SIS, BSB, ISI, as well as their hydrogenated and partially hydrogenated counterparts, including SEBS, SEB, SEP and others. By way of illustration, the examples of polymers synthesized by anionic polymerization suitable for their use as modifiers of asphalts and adhesives include linear elastomers produced by the copolymerization of at least one alkenyl aromatic monomer, and at least one conjugated diene monomer.

In a preferred embodiment the functionalized multi-arm polymer is characterized in that the polymer synthesized by anionic polymerization is synthesized from conjugated diene monomers and alkenyl aromatic monomers, and wherein the diene part has an approximate content of 8 to 80% molar of 1,2 structures.

In some modalities of linear elastomers, the molar proportion of the alkenyl aromatic monomer with respect to the conjugated diene monomer preferably ranges from 0.1 to approximately 1.0, preferably, from approximately 0.2 to approximately 0.5 and more preferably, from approximately 0.3 to 0.4.

In a preferred polymerization process, the functionalized multi-arm polymer described in the first aspect is characterized in that the polymer synthesized by anionic polymerization is obtained from alkenyl aromatic monomers, conjugated diene monomers or mixtures of them. For example for their use in blends with plastics the present inventors have surprisingly detected that good results are obtained when they comprise polystyrene.

As an example of said preferred polymerization, the polymer synthesized by anionic polymerization is prepared from alkenyl aromatic monomers and conjugated diene monomers in a molar proportion of aromatic vinyl monomer with respect to conjugated diene monomer of approximately 0.05 to 1.0.

Preferably, the functionalized multi-arm polymer comprises at least one polymer selected from the group that consists of polystyrene, polybutadiene, polyisoprene and random copolymers, in block or tapered, prepared from monomers selected from the group that consists of styrene, butadiene and isoprene.

The molecular weights of the arms of the polymer of the invention can be adjusted depending on requirements and varying the quantity of polymerized monomers (n) but normally have a molecular weight at the peak of the distribution, $M_p$, from approximately 3,000 to 300,000 g/mol. Preferably, the $M_p$ of the arms ranges from 20,000 g/mol to 200,000 g/mol.

The molecular weight of the polymers synthesized by anionic polymerization in the present invention is conveniently measured by a Gel Permeation Chromatography (GPC) apparatus, which has been calibrated using the universal calibration curve method. The calibration is carried out with polymers of known molecular weight and they must have the same molecular structure and the same composition as the polymers to be characterized have. The polymers synthesized by anionic polymerization are essentially monodisperse (the ratio weight average molecular weight/number average molecular weight is close to one), being appropriate to report the molecular weight at the peak of the distribution, $M_p$, as the molecular weight of the polymer. Likewise, the molecular weight of the multi-arm polymers reported corresponds to the molecular weight at the peak of the distribution of the coupled chains. Determination of the degree of coupling of the branched polymers, i.e. determination of the number of covalently bonded arms to the multi-arm polymer, is determined on relating the molecular weight of the multi-arm polymer at the peak of the distribution with that of the molecular weight of the arm at the peak of the distribution.

The polymer synthesized by anionic polymerization may contain monomers of alkenyl aromatics, conjugated dienes or mixtures of them which are anionically polymerized. In one embodiment the quantity of monomers of conjugated dienes varies between 8 to 80% molar.

Examples of initiators of the functionalized and protected polymer synthesized by anionic polymerization of formula (II): Li—Z-T-(A-$R^1R^2R^3$)$_m$, include, but are not limited to:
tert-alkoxy-alkyllithiums,
omega (tert-alkoxy)-1-alkyllithiums such as 3-(1,1-dimethylethoxy)-1-propyllithium and 3-(tert-butyldimethylsilyloxy)-1-propyllithium,
tert-alkylthio-alkyllithiums,
omega-(tert-alkylthio)-1-alkyllithiums such as 3-(1,1-dimethylethylthio)-1-propyllithium,
omega-(tert-butoxydimethylsilyloxy)-1-alkyllithiums,
omega-(tert-butoxydimethylsilylthio)-1-alkyllithiums, (dialkylamino)-1-alkyllithiums,
omega-(dialkylamino)-1-alkyllithiums such as 3-(dimethylamino)-1-propyllithium, (bis-tert-alkylsilylamino)-1-alkyllithiums,
and omega-(bis-tert-alkylsilylamino)-1-alkyllithiums such as and 3-(di-tert-butyldimethylsilylamino)-1-propyllithium.

Additional examples which may be used in the present invention include, but are not limited to:
3-(1,1-dimethylethoxy)-1-propyllithium,
3-(1,1-dimethylethoxy)-2-methyl-1-propyllithium,
3-(1,1-dimethylethoxy)-2,2-dimethyl-1-propyllithium,
4-(1,1-dimethylethoxy)-1-butyllithium,
5-(1,1-dimethylethoxy)-1-pentyllithium,
6-(1,1-dimethylethoxy)-1-hexyllithium,
8-(1,1-dimethylethoxy)-1-octyllithium,
3-(1,1-dimethylpropoxy)-1-propyllithium,
3-(1,1-dimethylpropoxy)-2-methyl-1-propyllithium,
3-(1,1-dimethylpropoxy)-2,2-dimethyl-1-propyllithium,
4-(1,1-dimethylpropoxy)-1-butyllithium,
5-(1,1-dimethylpropoxy)-1-pentyllithium,
6-(1,1-dimethylpropoxy)-1-hexyllithium,
8-(1,1-dimethylpropoxy)-1-octyllithium,
3-(t-butyldimethylsilyloxy)-1-propyllithium,
3-(t-butyldimethylsilyloxy)-2-methyl-1-propyllithium,
3-(t-butyldimethylsilyloxy)-2,2-dimethyl-1-propyllithium,
4-(t-butyldimethylsilyloxy)-1-butyllithium,
5-(t-butyldimethylsilyloxy)-1-pentyllithium,
6-(t-butyldimethylsilyloxy)-1-hexyllithium,
8-(t-butyldimethylsilyloxy)-1-octyllithium
3-(trimethylsilyloxy)-2,2-dimethyl-1-propyllithium,
3-(dimethylamino)-1-propyllithium,
3-(dimethylamino)-2-methyl-1-propyllithium,
3-(dimethylamino)-2,2-dimethyl-1-propyllithium,
4-(dimethylamino)-1-butyllithium,
5-(dimethylamino)-1-pentyllithium,
6-(dimethylamino)-1-hexyllithium,
8-(dimethylamino)-1-propyllithium,
3-(hexamethyleneimine)-1-propyllithium,
4-(hexamethyleneimine)-1-butyllithium,
5-(hexamethyleneimine)-1-pentyllithium,
6-(hexamethyleneimine)-1-hexyllithium,
8-(hexamethyleneimine)-1-octyllithium,
3-(t-butyldimethylsilylthio)-1-propyllithium,
3-(t-butyldimethylsilylthio)-2-methyl-1-propyllithium,
3-(t-butyldimethylsilylthio)-2,2-dimethyl-1-propyllithium,
4-(t-butyldimethylsilylthio)-1-butyllithium,
6-(t-butyldimethylsilylthio)-1-hexyllithium,
3-(trimethylsilylthio)-2,2-dimethyl-1-propyllithium,
3-(1,1-dimethylethylthio)-1-propyllithium,
3-(1,1-dimethylethylthio)-2-methyl-1-propyllithium,
3-(1,1-dimethylethylthio)-2,2-dimethyl-1-propyllithium,
4-(1,1-dimethylethylthio)-1-butyllithium,
5-(1,1-dimethylethylthio)-1-pentyllithium,
6(1,1-dimethylethylthio)-1-hexyllithium,
8-(1,1-dimethylethylthio)-1-octyllithium,
3-(1,1-dimethylpropylthio)-1-propyllithium,
3-(1,1-dimethylpropylthio)-2-methyl-1-propyllithium,
3-(1,1-dimethylpropylthio)-2,2-dimethyl-1-propyllithium,
4-(1,1-dimethylpropylthio)-1-butyllithium,
5-(1,1-dimethylpropylthio)-1-pentyllithium,
6-(1,1-dimethylpropylthio)-1-hexyllithium,
and 8-(1,1-dimethylpropylthio)-1-octyllithium.

The compounds of formula (II) Li—Z-T-(A-$R^1R^2R^3$)$_m$ may be prepared when said formula represents the compounds of formula Li—Z—O—C—$R^1R^2R^3$, Li—Z—O—Si—$R^1R^2R^3$, Li—Z—N—(C—$R^1R^2R^3$)$_2$, Li—Z—N—(C—$R^1$, $R^2R^3$)$_2$, Li—Z—S—C—$R^1R^2R^3$ and Li—Z—S—Si—$R^1R^2R^3$, by the reaction of their respective haloalkenes, e.g. Cl—Z-T-(A-$R^1R^2R^3$)$_m$ and Br—Z-T-(A-$R^1R^2R^3$)$_m$, with lithium metal using an inert hydrocarbon solvent at its reflux temperature.

Tertiary amine-1-haloalkenes useful for the preparation of, for example, the Li—Z—N-(A-$R^1R^2R^3$)$_2$ compounds of the present invention, are compounds with the following structure:

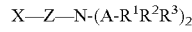

And

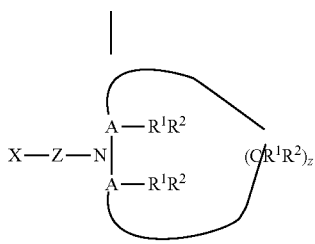

z being an integer number from 1 to 7
and X a halogen, preferably Cl or Br.

Examples of tertiary amino-1-haloalkenes include, but are not limited to
3-(N,N-dimethylamino)-1-propyl halide,
3-(N,N-dimethylamino)-2-methyl-1-propyl halide,
3-(N,N-dimethylamino)-2,2-dimethyl-1-propyl halide,
4-(N,N-dimethylamino)-1-butyl halide,
5-(N,N-dimethylamino)-1-pentyl halide,
6-(N,N-dimethylamino)-1-hexyl halide,
3(N,N-diethylamino)-1-propyl halide,
3-(N,N-diethylamino)-2-methyl-1-propyl halide,
3-(N,N-diethylamino)-2,2-dimethyl-1-propyl halide,
4-(N,N-diethylamino)-1-butyl halide,
5-(N,N-diethylamino)-1-pentyl halide,
6-(N,N-diethylamino)-1-hexyl halide,
3-(N-ethyl-N-methylamino)-1-propyl halide,
3-(N-ethyl-N-methylamino)-2-methyl-1-propyl halide,
3-(N-ethyl-N-methylamino)-2,2-dimethyl-1-propyl halide,
4-(N-ethyl-N-methylamino)-1-butyl halide,
5-(N-ethyl-N-methylamino)-1-pentyl halide,
6-(N-ethyl-N-methylamino)-1-hexyl halide,
3-(piperidino)-1-propyl halide, 3-(piperidino)-2-methyl-1-propyl halide,
3-(piperidino)-2,2-dimethyl-1-propyl halide,
4-(piperidino)-1-butyl halide,
5-(piperidino)-1-pentyl halide,
6-(piperidino)-1-hexyl halide,
3-(pyrrolidino)-1-propyl halide,
3-(pyrrolidino)-2-methyl-1-propyl halide,
3-(pyrrolidino)-2,2-dimethyl-1-propyl halide,
4-(pyrrolidino)-1-butyl halide,
5-(pyrrolidino)-1-pentyl halide,
6-(pyrrolidino)-1-hexyl halide,
3-(hexamethyleneimino)-1-propyl halide,
3-(hexamethyleneimino)-2-methyl-1-propyl halide,
3-(hexamethyleneimino)-2,2-dimethyl-1-propyl halide,
4-(hexamethyleneimino)-1-butyl halide,
5-(hexamethyleneimino)-1-pentyl halide,
6-(hexamethyleneimino)-1-hexyl halide,
3-(N-isopropyl-N-methyl)-1-propyl halide,
2-(N-isopropyl-N-methyl)-2-methyl-1-propyl halide,
3-(N-isopropyl-N-methyl)-2,2-dimethyl-1-propyl halide,
and 4-(N-isopropyl-N-methyl)-1-butyl halide, The halo- or halide group being selected from chlorine and bromine.

Omega-hydroxy protected haloalkanes for the present invention include, but are not limited to:
3-(1,1-dimethylethoxy)-1-propyl halide,
3-(1,1-dimethylethoxy)-2-methyl-1-propyl halide,
3-(1,1-dimethylethoxy)-2,2-dimethyl-1-propyl halide,
4-(1,1-dimethylethoxy)-1-butyl halide,
5-(1,1-dimethylethoxy)-1-pentyl halide,
6-(1,1-dimethylethoxy)-1-hexyl halide,
8-(1,1-dimethylethoxy)-1-octyl halide,
3-(1,1-dimethylpropoxy)-1-propyl halide,
3-(1,1-dimethylpropoxy)-2-methyl-(propyl halide,
3-(1,1-dimethylpropoxy)-2,2-dimethyl-1-propyl halide,
4-(1,1-dimethylpropoxy)-1-butyl halide
5-(1,1-dimethylpropoxy)-1-pentyl halide,
6-(1,1-dimethylpropoxy)-1-hexyl halide,
8-(1,1-dimethylpropoxy)-1-octyl halide,
4-(methoxy)-1-butyl halide,
4-(ethoxy)-1-butyl halide,
4-(propyloxy)-1-butyl halide,
4-(1-methylethoxy)-1-butyl halide,
3-(triphenylmethoxy)-2,2-dimethyl-1-propyl halide,
4-(triphenylmethoxy)-1-butyl halide,
3-[3-(dimethylamino)-1-propyloxy]-1-propyl halide,
3-[2-(dimethylamino)-1-ethoxy]-1-propyl halide,
3-[2-(diethylamino)-1-ethoxy]-1-propyl halide,
3-[2-(diisopropyl)amino]-1-ethoxy]-1-propyl halide,
3-[2-(1-piperidine)-1-ethoxy]-1-propyl halide,
3-[2-(1pyrrolidino)-1-ethoxy]-1-propyl halide,
4-[3-(dimethylamino)-1-propyloxy]-1-butyl halide,
6-[2-(1-piperidine)-1-ethoxy]-1-hexyl halide,
3-[2-(methoxy)-1-ethoxy]-1-propyl halide,
3-[2-(ethoxy)-1-ethoxy]-1-propyl halide,
(methoxy)-1-ethoxy-1-butyl halide,
5-[2-(ethoxy)-1-ethoxy]-1-pentyl halide,
3-[3-(methylthio)-1-propyloxy]-1-propyl halide,
3-[4-(methylthio)-1-butyloxy]-1-propyl halide,
3-(methylthiomethoxy)-1-propyl halide,
6-[3-(methylthio)-1-propyloxy]-1-hexyl halide,
3-[4-(methoxy)-benzyloxy]-1-propyl halide,
3-[4(1,1-dimethylethoxy)-benzyloxy]-1-propyl halide,
3-[2,4-(dimethoxy)benzyloxy]-1-propyl halide,
8-[4-(methoxy)-benzyloxy]-1-octyl halide,
4-[4(methylthio)-benzyloxy]-1-butyl halide,
3-[4-dimethylamino)-benzyloxy]-1-propyl halide,
6-[4-(dimethylamino)-benzyloxy]-1-hexyl halide,
5-(triphenylmethoxy)-1-pentyl halide,
6-(triphenylmethoxy)-1-hexyl halide,
8-(triphenylmethoxy)-1-octyl halide.
3-(t-butyldimethylsilyloxy)-1-propyl halide,
3-(t-butyldimethylsilyloxy)-2-methyl-1-propyl halide,
3-(t-butyldimethylsilyloxy)-2,2-dimethyl-1-propyl halide,
4-(t-butyldimethylsilyloxy)-1-butyl halide,
5-(t-butyldimethylsilyloxy)-1-pentyl halide,
6-(t-butyldimethylsilyloxy)-1-hexyl halide,
8-(t-butyldimethylsilyloxy)-1-octyl halide,
3-(t-butyldiphenylilsilyloxy)-1-propyl halide,
3-(t-butyldiphenylilsilyloxy)-2-methyl-1-propyl halide,
3-(t-butyldiphenylilsilyloxy)-2,2-dimethyl-1-propyl halide,
6-(t-butyldimethylsilyloxy)-1-hexyl halide,
and 3-(trimethylsilyloxy)-2,2-dimethyl-1-propyl halide.

The halo- or halide group being selected from chlorine and bromine.

These Omega-hydroxy protected haloalkanes may be prepared by processes described in A. Alexaquis, M. Gardette, and S. Colin, Tetrahedron Letters, 29, 1988, 2951. B. Figadere, X. Franck and A. Cave, Tetrahedron Letters, 34, 1993, 5893, J. Almena, F. Foubelo and M. Yus, Tetrahedron, 51, 1995, 11883. T. Ferrari and P. Vogel, SYNLETT, 1991, 233.

Omega-thio-protected haloalkanes useful for the present invention include, but are not limited to:
3-(methylthio)-1-propyl halide,
3-(methylthio)-2-methyl-1-propyl halide,
3-(methylthio)-2,2-dimethyl-1-propyl halide,
4-(methylthio)-1-butyl halide, 5-(methylthio)-1-pentyl halide,
6-(methylthio)-1-hexyl halide,
8-(methylthio)-1-octyl halide,
3-(methoxymethylthio)-1-propyl halide,
3-(methoxymethylthio)-2-methyl-1-propyl halide,
3-(methoxymethylthio)-2,2-dimethyl-1-propyl halide,
4-(methoxymethylthio)-1-butyl halide,
5-(methoxymethylthio)-1-pentyl halide,
6-(methoxymethylthio)-1-hexyl halide,
8-(methoxymethylthio)-1-octyl halide,
3-(1,1-dimethylethylthio)-1-propyl halide,
3-(1,1-dimethylethylthio)-2-methyl-propyl halide,
3-(1,1-dimethylethylthio)-2,2-dimethyl-1-propyl halide,
4-(1,1-dimethylethylthio)-1-butyl halide,
5-(1,1-dimethylethylthio)-1-pentyl halide,
6-(1,1-dimethylethylthio)-1-hexyl halide,
8(1,1-dimethylethylthio)-1-octyl halide,
3-(11-dimethylpropylthio)-1-propyl halide,
3-(1,1-dimethylpropylthio)-2-methyl-1-propyl halide,
3-(1,1-dimethylpropylthio)-2,2-dimethyl-1-propyl halide,
4-(1,1-dimethylpropylthio)-1-butyl halide,
5-(1,1-dimethylpropylthio)-1-pentyl halide,
6-(1,1-dimethylpropylthio)-1-hexyl halide,
8-(1,1-dimethylpropylthio)-1-octyl halide,
3-(cyclopentylthio)-1-propyl halide,
3-(cyclopentylthio)-2-methyl-1-propyl halide,
3-(cyclopentylthio)-2,2-dimethyl-1-propyl halide,
4-(cyclopentylthio)-1-butyl halide,
5-(cyclopentylthio)-1-pentyl halide,
6-(cyclopentylthio)-1-hexyl halide,
8-(cyclopentylthio)-1-octyl halide,
3-(cyclohexylthio)-1-propyl halide,
3-(cyclohexylthio)-2-methyl-1-propyl halide,
3-(cyclohexylthio)-2,2-dimethyl-1-propyl halide,
4-(cyclohexylthio)-1-butyl halide,
5-(cyclohexylthio)-1-pentyl halide,
6-(cyclohexylthio)-1-hexyl halide,
8-(cyclohexylthio)-1-octyl halide,
3-(t-butyldimethylsilylthio)-1-propyl halide,
3-(t-butyldimethylsilylthio)-2-methyl-1-propyl halide,
3-(t-butyldimethylsilylthio)-2,2-dimethyl-1-propyl halide,
3-(t-butyldimethylsilylthio)-2-methyl-1-propyl halide,
4-(t-butyldimethylsilylthio)-1-butyl halide,
6-(t-butyldimethylsilylthio)-1-hexyl halide
and 3-(trimethylsilylthio)-2,2-dimethyl-1-propyl halide.

The halo- or halide group being selected from chlorine and bromine.

These omega-thio-protected haloalkanes may be prepared by processes described in Franck and A. Cave, Tetrahedron Letters, 34, 1993, 5893, J. Almena, F. Foubelo, and M. Yus, Tetrahedron, 51, 1995, 11883, D. F. Taber and Y. Wang, J. Org, Chem., 58, 1993, 6470, F. D. Toste and I. W. J. Still, Synlett, 1995, 159 and U.S. Pat. No. 5,493,044.

As previously mentioned not all the polymer chains synthesized by anionic polymerization are covalently bonded to the coupling agent. The percentage of coupled chains may vary from approximately 2 to 98% by weight, being preferably covalently bonded to the coupling agent between 1 and 30 chains of the polymer synthesized by anionic polymerization, to the coupling agent. Preferably, the quantity of added coupling agent is such that the molar ratio of polymer synthesized by anionic polymerization to coupling agent is from 1:1 to 30:1.

The polymer synthesized by anionic polymerization may have a molecular weight at the peak of the distribution of approximately 20,000 to 500,000 g/mol.

In another embodiment of the first aspect of the invention, the functionalized multi-arm polymer is characterized in that it has a molecular weight at the peak of the distribution of 5,000 to 2,000,000 g/mol.

Normally, the coupling agent is found in lower proportion, for which reason in a preferred embodiment it varies from 0.001 to 5% by weight of coupling agent based on the total quantity of coupling agent and polymer synthesized by anionic polymerization of the reaction.

The preferred coupling agent of the present invention is the oligomer obtained by free radical polymerization of at least one monomer selected from the group that consists of alkenyl aromatic monomers, epoxy-functional acrylic monomers and mixtures of them; and at least one monomer selected from the group that consists of alkenyl aromatic monomers, epoxy-functional acrylic monomers, anhydride-functional acrylic monomers, ester-functional acrylic monomers, carboxylic acid-functional acrylic monomers and any of their mixtures, where the coupling agent has an average molecular weight in number from approximately 500 to approximately 10,000 g/mol, and an average molecular weight in weight from approximately 1,000 to approximately 20,000 g/mol. The weight average molecular weights or number average molecular weights are calculated by GPC, as previously described, but in this case referred to polystyrene standards. This coupling agent is commercialized for example, as ADR-4318®, commercialized by BASF. The oligomers preferred as coupling agents are those which contain from approximately 1 to 60% molar of epoxy-functional or carboxylic acid-functional acrylic monomers.

Other preferred coupling agents include divinylbenzene or alternatively multifunctional chlorosilanes. In another modality mixtures of the preferred coupling agents can also be used.

All preferred embodiments of the first aspect of the invention are valid for the second aspect.

The preparation methods of the functionalized multi-arm polymers of the first and second aspect and the preferred embodiments of the present invention are known by persons skilled in the art, although the preferred embodiments for the synthesis methods of said polymers are detailed below.

A preferred embodiment comprises making the polymer synthesized by anionic polymerization react with the coupling agent. The coupling reaction is preferably performed in the same reaction area where the synthesis of the polymer synthesized by anionic polymerization is carried out.

Preferably, the polymer synthesized by anionic polymerization is synthesized in a first reaction stage and is made to react with the coupling agent in a second reaction stage.

In another embodiment the method of polymerization comprises polymerizing the monomers of the polymer synthesized by anionic polymerization, adding a sufficient quantity of termination agent to deactivate part of the living chains in the polymer synthesized by anionic polymerization and making at least some of the living chains react with the coupling agent.

In another preferred embodiment the proportion of coupling agent with respect to the polymer synthesized by anionic polymerization could be from 0.001 to 5% by weight. Preferably, the average number of polymer chains synthesized by anionic polymerization, which is made to react with the coupling agent, is from approximately 2 to 30.

Said polymerization method, according to the previous aspects, is preferably characterized in that from 2 to 90% molar of the polymer synthesized by anionic polymerization undergoes coupling reactions, preferably between 20 and 60% molar.

Examples of hydrogenation methods useful for the present invention are disclosed in U.S. Pat. Nos. 4,970,254, 5,166,277, 5,393,843, 5,496,898 and 5,583,185. Hydrogenation of the functionalized multi-arm polymer can be performed in situ in the reaction medium, such as hexane, cyclohexane or heptane. For example, the solution is placed in contact with hydrogen gas in presence of a catalyst, such as a nickel, titanium catalyst, etc. The hydrogenation is typically carried out at temperatures of 25° C. to 150° C., with a typical hydrogen pressure of 0.5 atm to 20 atm. The hydrogenation process may be controlled by Infrared spectroscopy (IR) or Nuclear Magnetic Resonance (NMR). The hydrogenation reaction is carried out until at least 85% of the unsaturations of the arms synthesized by anionic polymerization has been saturated, preferably until at least 90% of the unsaturation has been hydrogenated, and even more preferably continues until at least 99% of the unsaturation has been hydrogenated.

The deprotection step can be carried out before or after the optional hydrogenation of the unsaturated multi-arm polymers. For example, to remove tert-alkyl groups, the protected polymer is mixed with an ion exchange resin such as Amberlyst® 15 and heated to a high temperature, for example 150° C., or at the reflux temperature of the solvent (cyclohexane) until the deprotection process is completed. Furthermore, the tert-alkyl protective groups may also be eliminated by the reaction of the polymer with trifluoric acetic acid or with p-toluenesulfonic acid. The additional methods of tert-alkyl deprotection may be found in T. W. Greene and P. G. M. Wuts, *Protective groups in Organic Synthesis*, Second Edition, Wiley, New York, 1991, page 41. Tert-butyldimethylsilyl can be eliminated by treatment of the functionalized multi-arm polymer with acids, such as hydrochloric acid, acetic acid, p-toluenesulfonic acid, Dowes 50W-X8, or a source of fluorine ions, for example, tetra-n-butylammonium, potassium fluoride and 18-corona-6, or a pyridine-hydrofluoric acid complex. Additional methods for elimination of tert-butyldimethylsilyl may be found in T. W. Greene and P. G. M. Wuts, Protective groups in Organic Synthesis, Second Edition, Wiley, New York, 1991, page 80-83. The functionalized multi-arm polymer, unsaturated or hydrogenated, is recovered by conventional procedures, like elimination by washing of the catalyst with an aqueous acid, followed by elimination of the solvent or precipitation of the polymer. Surprisingly, the improvements observed in the deprotected functionalized multi-arm polymers are valid in many cases for protected functionalized multi-arm polymers, especially in applications such as adhesives, asphalts and modification of plastics. This allows, for example, direct use of the protected polymers in hot-melt adhesive compositions, without the need to carry out the deprotection, which entails a reduction in process duration and production costs. Without wanting to be bound by the theory, this behaviour may be due to the fact that the polymers are deprotected during the formation process of the different composition types.

The present invention is not only limited to new polymers and their synthesis processes, but also includes compositions thereof. For example, the functionalized multi-arm polymers of the first and second aspects can be included in adhesive compositions. Preferably, the polymer that contains said adhesive compositions is characterized in that the reaction contains from approximately 0.001 to 5% by weight of coupling agent based on the total quantity of coupling agent and polymer synthesized by anionic polymerization, which were made to react. The adhesives, especially the hot-melt adhesives, prepared with the polymers of the present invention show improved Peel, Tack and Shear properties to the hot-melt adhesives of the state of the art.

The adhesive composition may contain at least one additive selected from the group that consists of tackifying resins, stabilizers, plasticizers and antioxidants. In some of these applications, from approximately 15 to 30, and more preferably from 18 to 25, parts by weight of the multi-arm polymer object of this invention is mixed with other components of conventional adhesive formulation, such a tackifiers, stabilizers, plasticizers and antioxidants, to give these adhesive compositions improved properties compared with the adhesives prepared with the same composition, using the same type of polymer without the introduction of the functional groups, whether protected or not, in terminal positions and/or the hydrogenation of the unsaturated chain. Examples of suitable tackifiers include resins with high and low softening points, which are compatible with the polymer. These include hydrogenated resins, colophony esters, polyterpene resins, terpene phenolic resins, and coumarone-indene resins. In some illustrative modalities, the quantity of fixing resins in the composition ranges from approximately 45 to 65% by weight. The plasticizers, generally known as extender oils, include mineral oils, paraffin oils and naphthenic oils. In some illustrative modalities, the quantity of plasticizer in the composition ranges from approximately 15 to 30% by weight. The antioxidants may be used to inhibit the thermal and ultraviolet ray oxidation processes, and are commonly added to the adhesive composition in quantities from approximately 0.05 to 3% by weight. The examples of antioxidants include phenolic compounds, and thio compounds. In a preferred embodiment the composition comprises from 15 to 30% by weight of tackifying resin, from approximately 15 to 30 percent by weight of plasticizer and from approximately 0.05 to 2 percent by weight of antioxidant. In a preferred embodiment, the adhesive compositions can be used in multiple applications, for example in adhesives for packaging, labels and adhesive tapes, construction and as pressure-sensitive adhesives to be used in manufacturing disposable elastic articles.

Furthermore, the polymers of the present invention are useful for reinforcing materials or to prepare composite materials, which mean that these polymers can be mixed with a reinforcing material or with the material that is going to be reinforced. The materials which are going to be reinforced can be selected from the group that consists of asphalt, plastics and tyres. Good results have been obtained when plastics selected from polyamides, polyurethanes, polyethers, polysulfones, polyether ketones, polyether ether ketones, polyetherimides, polycarbonates, polyesters, polystyrene and copolymers of them, are reinforced. The reinforced material or compound is useful for the production of articles and can be an extruded article, an injection-moulded article, a compression-moulded article or a tyre.

Another aspect is a modified asphalt which comprises asphalt mixed with the functionalized multi-arm polymer according to any of the first and second aspects. The asphalts may contain from approximately 1 to 25% by weight of the functionalized multi-arm polymer based on the total weight of the asphalt and of the functionalized multi-arm polymer. Preferably, the modified asphalt contains from approximately 5 to 20% by weight of the functionalized multi-arm polymer. These asphaltic blends modified with the functionalized multi-arm polymers can be used in applications such as roads, asphalt membranes and the like.

Furthermore, the polymers of the present invention are useful for modifying plastics, preferably using blends that contain from approximately 1 to 40 percent by weight of functionalized multi-arm polymer, based on the total weight of the functionalized multi-arm polymer and the plastic. The plastic preferably contains at least one polymer that is selected from the group that consists of polystyrene, polybutadiene, polyisoprene and random copolymers, in block or tapered, prepared from monomers selected from the group that consists of styrene, butadiene and isoprene, and which have an average molecular weight at the peak of the distribution of approximately 3,000 to 300,000 g/mol. The functionalized multi-arm polymers mixed with plastic are preferably those characterized in that the reaction product contains from approximately 0.1 to 8% by weight of coupling agent based on the total quantity of functionalized multi-arm polymer. The polymer of the present invention preferably contains polystyrene for its blend in plastics. The polymers of the present invention and plastics can be mixed in a wide range of proportions, but the preferred is from 1 to 20% by weight of functionalized multi-arm polymer based on the total weight of the functionalized multi-arm polymer and the plastic. A great variety of plastics can be mixed, but preferably the plastic is selected from the group that consists of polyamides, polyurethanes, polyethers, polysulfones, polyether ketones, polyether ether ketones, polyimides, polyetherimides, polycarbonates, polyesters, polystyrene and copolymers of them. Furthermore, said plastic mixed with the polymer of the invention can be mixed with another plastic to be modified, the proportions of the plastic blends can vary from 1 to 40% by weight of modified plastic with the functionalized multi-arm polymer, based on the total weight of the plastic and the functionalized multi-arm polymer.

Throughout the description and claims the word "comprises" and its variants do not aim to exclude other technical characteristics, additives, components or steps. For persons skilled in the art, other objects, advantages and characteristics of the invention shall be gathered in part from the description and in part from practice of the invention. The following examples are provided by way of illustration and do not aim to be limitative of the present invention.

EXAMPLES

Synthesis of Alcohol Functionalized Multi-Arm Polymers

The OH functionalized (protected or deprotected) SB multi-arm copolymers were synthesized in a 20 L Buchi reactor, using 3-(t-butyldimethylsilyloxy)-1-propyl lithium as initiator, commercially known as PFI-103 and commercialized by FMC. In all cases 6500 g of cyclohexane, 1130 g of a solution of styrene in cyclohexane (24% w), 50 mL of THF (except for medium vinyl polymers, where 10 mL of THF were added), and 46 mL of PFI-103 solution in cyclohexane (15% w) were used, enabling the reaction to take place at 65° C. for 15 minutes, later adding 610 g of 1,3-butadiene. Approximately 35 minutes later, the system temperature was increased to 70° C. and the SB copolymer was coupled by adding 11 mL of a solution of ADR-4318 in cyclohexane (20% w), a stage which was left to take place for 20 minutes. In the case of hydrogenated copolymers, the system temperature was immediately increased to 90° C., then adding 31 mL of a solution of metallocenic catalyst of titanium, in THF/cyclohexane (0.2 M). The block copolymers which did not need to be hydrogenated were deactivated with 23 mL of BHT solution (10% w in cyclohexane).

For comparative purposes, non-functionalized SB multi-arm copolymers were synthesized. These non-functionalized copolymers were synthesized using the same procedure as the functionalized ones, except 48 mL of n-butyl lithium (2.6% w in cyclohexane) were added instead of PFI-103.

After the synthesis stage, some of the functionalized SB multi-arm copolymers with protected OH groups were subjected to a hydrolysis stage to prepare deprotected multi-arm polymers, samples functionalized with OH. This reaction was carried out in a 10 L glass reactor, treating the polymeric solutions with hydrochloric acid at 80° C. for 3 h. The copolymers were treated with vapour to eliminate the solvent, and were dried in a vacuum oven at 80° C.

The copolymers were characterized by GPC (THF as eluent, universal calibration curve) to obtain their molecular weight, their degree of branching and their coupling percentage, and by $^1$H-NMR to determine their microstructure, composition and deprotection level.

The characteristics of the branched copolymers are shown in Table 1.

TABLE 1

Characteristics of the multi-arm copolymers used in the adhesive formulations.

| Sample | Type of polymer[1] | Mp linear[2], g/mol | Mp coupled part[3], g/mol | Coupled product[4], % w | Degree of coupling[5] | Total styrene[6], % w | Vinyl content[6], % w | Hidrogenation[6], % w |
|---|---|---|---|---|---|---|---|---|
| S9618 C01 (reference) | SBS-r medium vinyl | 47300 | 426100 | 36 | 9.0 | 32.2 | 13.3 | N/A |
| H9618 18 | RO-SBS-r medium vinyl | 45900 | 444000 | 50 | 9.7 | 27 | 25 | N/A |
| H9618 18 dep[7] | HO-SBS-r medium vinyl | 45900 | 444000 | 50 | 9.7 | 27 | 25 | N/A |
| H9618-17 | SBS-r high vinyl | 43200 | 397400 | 50 | 9.2 | 36 | 36 | N/A |
| H9618-10 | RO-SBS-r high vinyl | 44500 | 465900 | 37 | 10.5 | 30.4 | 38.4 | N/A |
| H9618-09 dep[7] | HO-SBS-r high vinyl | 44400 | 472600 | 40.1 | 10.6 | 31.9 | 39 | N/A |
| H9618-11 | SEBS-r high vinyl | 48500 | 512000 | 51.5 | 10.6 | 30.1 | 38 | 99 |

TABLE 1-continued

Characteristics of the multi-arm copolymers used in the adhesive formulations.

| Sample | Type of polymer[1] | Mp linear[2], g/mol | Mp coupled part[3], g/mol | Coupled product[4], % w | Degree of coupling[5] | Total styrene[6], % w | Vinyl content[6], % w | Hidrogenation[6], % w |
|---|---|---|---|---|---|---|---|---|
| H9618-07 | RO-SEBS-r high vinyl | 59600 | 588000 | 44.9 | 9.9 | 30.2 | 38.4 | 99 |
| H9618-15 | RO-SEBS-r high vinyl | 43100 | 439700 | 37 | 10.2 | 32.4 | 38.6 | 98 |
| H9618-06 dep[7] | HO-SEBS-r high vinyl | 53200 | 520400 | 43.1 | 9.8 | 32.4 | 47.8 | 97 |

[1] "r" relates to multi-arm products
[2] Molecular weight at the peak of the distribution of the SB copolymer, obtained by GPC using the universal calibration curve method
[3] Molecular weight at the peak of the distribution of the coupled product, obtained by GPC using the universal calibration curve method
[4] Quantity of coupled product (branched) obtained as percentage by weight of the GPC curves
[5] Degree of coupling (degree of branching) obtained from the Mp coupled product to Mp linear product ratio
[6] Obtained from $^1$H-NMR, vinyl content on butadiene base
[7] Dep relates to deprotected copolymer Synthesis of Tertiary Amine Functionalized Multi-Arm Polymers The tertiary amine functionalized SB multi-arm copolymers were synthesized in a 2 L Buchi reactor, using 3-dimethylamino-1-propyl lithium as initiator, commercially known as Al-200. In all cases 723 g of cyclohexane, 180 mL of a solution of styrene in cyclohexane (24% w, density 0.78), 3.7 g of THF, and 4.4 mL of a solution of Al-200 in cyclohexane (11% w, density 0.8 g/mL, MW 229.3 g/mol) were used, allowing the reaction to take place at 60° C. for 15 minutes, later adding 68 g of 1,3-butadiene. Approximately 40 minutes later, a determined quantity of coupling agent ADR-4318 was added (solution in cyclohexane of 20% w, density 0.79 g/mL), 0.8 mL, 1.3 mL or 1.8 mL, to give a molar ratio of coupling agent to initiator of 0.04, 0.07 and 0.1, respectively. The polymeric solutions were deactivated with 4.7 mL of BHT solution (10% w in cyclohexane).

The copolymers were characterized by GPC (THF as eluent, universal calibration curve) to obtain their molecular weight, their degree of branching and their coupling percentage, and by $^1$H-NMR to determine their microstructure, composition and deprotection level.

In this way, functionalized multi-arm copolymers having tertiary amine at the chain ends and with the characteristics indicated in Table 2 were obtained.

TABLE 2

Characteristics of the tertiary amine functionalized multi-arm copolymers.

| Sample | ADR-4318/Al-200, mol/mol | Mp linear 1[1], g/mol | Mp coupled part[2], g/mol | Coupled product[3], % w | Degree of coupling[4] | Total styrene[5], % w | Vinyl Content[5], % w |
|---|---|---|---|---|---|---|---|
| m-SB-amine 1 | 0.04 | 57800 | 484400 | 14.5 | 8.4 | 33.2 | 38.0 |
| m-SB-amine 2 | 0.07 | 58500 | 516900 | 28.9 | 8.8 | 32.8 | 37.6 |
| m-SB-amine 3 | 0.1 | 59500 | 509800 | 37.5 | 8.6 | 32.8 | 39.1 |

[1] Molecular weight at the peak of the distribution of the SB copolymer, obtained by GPC using the universal calibration curve method
[2] Molecular weight at the peak of the distribution of the coupled product, obtained by GPC using the universal calibration curve method
[3] Quantity of coupled product (branched) obtained as percentage by weight of the GPC curve
[4] Degree of coupling (degree of branching) obtained from the Mp coupled product to Mp linear product ratio
[5] Obtained from $^1$H-NMR, vinyl content referring to butadiene fraction The results show that the quantity of coupled product increases with greater addition of ADR-4318, whilst the degree of coupling remains practically constant. Therefore, the degree of coupling depends on the initial size of the SB copolymer chains, whilst the coupling percentage depends on the coupling agent added.

Characteristics of ADR-4318.

|  | ADR-4318 |
|---|---|
| Composition | |
| Styrene, % weight | 11.88 |
| MMA, % weight | 1.01 |
| EHA, % weight | 79.67 |
| GMA, % weight | 7.44 |
| Physical properties | |
| Mn (GPC), g/mol | 2,600 |
| Mw (GPC), g/mol | 7,200 |
| Mw/Mn | 2.7 |
| Viscosity @ 25° C. (cP) | 28,500 |
| Tg, ° C. | −61.0 |
| EEW (g/mol) | 2,017 |
| Fn (Mn/EEW) | 1.31 |

Hot-Melt Adhesive Formulations with Escorez 5380 Resin

The samples of multi-arm branched hydrogenated copolymers (SEBS-r high vinyl, RO-SEBS-r high vinyl and HO-SEBS-r high vinyl) were assayed using the adhesive formulation shown in Table 3. The Primol 352 oil is naphthenic type, the Escorez 5380 resin is a hydrocarbonated cycloaliphatic resin, and I-1010 is an antioxidant.

TABLE 3

Formulation used to prepare hot-melt resins with Escorez 5380 resin.

|  | Phr[1] |
|---|---|
| Sample of polymer | 100 |
| Primol 352 | 120 |
| Escorez 5380 | 250 |
| I-1010 | 3 |

[1]Phr relates to "parts per hundred of rubber"

Pressure-sensitive hot-melt adhesives were formulated in a metal container equipped with a heating system and adjustable stirring speed system. The temperature was controlled in the range 177° C.+/−2° C. The preparation time was in the order of 2 hours for each adhesive sample.

The adhesives were applied to a Mylar film (PET), 0.002" thick at 165° C., and they were covered with silicon paper to avoid their contamination. The adhesives were stored in a controlled conditions area at 50% humidity and 23° C. before being characterized.

Specimens to determine Peel at 180°, Loop Tack and Shear were obtained from the films impregnated with the adhesives. The substrate used for the assays were stainless steel panels with mirror finish. All assays were carried out in the controlled conditions area (50% humidity and 23° C.). The viscosity was measured in a Brookfield viscometer, model RVII. The adhesive properties were determined with the following equipment: Loop Tack tester, AR-100 Adhesion Release Tester, and Shear Bank.

Table 4 shows the thermal, mechanical and viscometric characterization of the adhesive formulations. Although differences were observed in the viscosity of the adhesives at 177° C., all were manageable and their values are typical for hot-melt. The behaviour of the softening temperature has a trend similar to that of viscosity, where the adhesive which contains the RO-SEBS-r high vinyl sample has the highest value. The elongation values for the three adhesives are very high, for which reason it is not possible to interpret their effect in the performance of the adhesives.

TABLE 4

|  | Adhesive formulation | | |
|---|---|---|---|
| Example | 1 | 2 | 3 |
| Polymer sample | H-9618-11 | H-9618-07 | H-9618-06 dep |
| Polymer Type | SEBS-r high vinyl | RO-SEBS-r high vinyl | HO-SEBS-r high vinyl |
| Brookfield Viscosity at 177° C., cP | 3000 | 9450 | 1790 |
| Softening temperature, ° C. | 108.0 | 123.6 | 110.8 |
| Elongation, % | 1279.0 | 1548.1 | 1032.5 |

Table 5 shows the results of the adhesive characteristic assay after being subjected to aging in an oven at 177° C. The results indicate that the adhesives exceed the commercial stability specifications, since the viscosities do not tend to increase before the required 72 hours. Normally, in SBS and SEBS products, the increase in viscosity relates to the polymer gelling process. Another demonstration of the thermal stability of the adhesives is the absence of "skin" in the samples subjected to thermal aging at 177° C. in an oven for a 72 hour period.

TABLE 5

Thermal stability tests at 177° C. (aging in oven).

|  |  | Adhesive formulation | | |
|---|---|---|---|---|
|  | Example | 1 | 2 | 3 |
|  | Polymer sample | H-9618-11 | H-9618-07 | H-9618-06 dep |
|  | Polymer type | SEBS-r high vinyl | RO-SEBS-r high vinyl | HO-SEBS-r high vinyl |
|  | Time, h | | | |
| Brookfield Viscosity, cP at 177° C. | 24 | 2611 | 8317 | 1468 |
|  | 48 | 2428 | 7300 | 978 |
|  | 72 | 2522 | 7467 | 1261 |
| Phase separation | 24 | No | No | No |
|  | 48 | No | No | No |
|  | 72 | No | No | No |
| "Skin" formation | 24 | No | No | No |
|  | 48 | No | No | No |
|  | 72 | No | No | No |

Table 6 shows the results of the assays related to product adhesivity. In the case of the Shear, it is clearly observed that both for the sample prepared with the protected functional group (RO-SEBS-r high vinyl), and for the sample made with the deprotected functional group (HO-SEBS-r high vinyl), higher Shear values have been obtained than for the sample prepared with the non-functionalized product (SEBS-r high vinyl). For the adhesive prepared with the protected functionalized hydrogenated polymer, the improvement is higher than 100% with respect to the non-functionalized hydrogenated polymer, whilst for the adhesive prepared with the functionalized hydrogenated polymer the improvement is almost 200%.

The Loop Tack measurement represents the force of attraction between the surface of the adhesive on the substrate, for which reason the impregnation density has not had much effect on this parameter. It is observed that for the sample prepared with the protected functionalized hydrogenated polymer (RO-SEBS-r high vinyl) the adhesivity decreases slightly, whilst for the adhesive prepared with the deprotected functional hydrogenated polymer (HO-SEBS-r high vinyl) the adhesivity increases by approximately 50% with respect to the reference that it is only hydrogenated (SEBS-r high vinyl).

For the case of the 180° Peel measurement the same trend is observed as that indicated for Loop Tack, with the adhesive which contains the HO-SEBS-r high vinyl rubber showing the maximum values.

TABLE 6

Adhesive properties.

| | Adhesive formulation | | |
|---|---|---|---|
| Example | 1 | 2 | 3 |
| Polymer sample | H-9618-11 | H-9618-07 | H-9618-06 dep |
| Polymer type | SEBS-r high vinyl | RO-SEBS-r high vinyl | HO-SEBS-r high vinyl |
| Static shear, 1,000 g load, minutes | 2.4 | 3.9 | 6.4 |
| Loop tack, PLI | 0.482 | 0.328 | 0.639 |
| 180° Peel, PLI | 0.956 | 0.853 | 2.215 |

Hot-Melt Adhesive Formulations with Piccolyte HM-106 Resin

The adhesive formulations containing Piccolyte HM-106 resin were prepared in accordance with the recipe shown in Table 7. The adhesives were prepared in a 1 L glass reactor at 160° C., adding in first place the oil, followed by the antioxidant, the resin, and the polymer. The blend was made in approximately 1 h, continually stirring under a constant stream of nitrogen. The adhesives were applied on a Mylar (PET) film at 165° C., and they were covered with silicon paper to avoid their contamination.

Specimens were obtained from films impregnated with adhesives to determine Probe Tack and SAFT (shear adhesion failure time). The Probe Tack was determined on 2.5 cm by side specimens with a Digital Polyken Probe Tack Tester TMI 80-02-01 apparatus equipped with a 0.5 cm diameter stainless steel probe, according to method ASTM D 2979. The SAFT was carried out in a forced air circulation oven (Cheminstruments) at 48° C. and with 0.25 kg weights. The substrate used for the assays were stainless steel panels with mirror finish. The viscosity was measured in a Brookfield viscometer, model RVII.

TABLE 7

Recipe used to prepare hot-melt adhesives with Piccolyte HM-106 resin.

| | Phr[1] |
|---|---|
| Sample of polymer | 100 |
| Piccolyte HM-106 resin | 200 |
| NYNAS naphthenic acid | 96 |
| I-1330/I-168 | 2/2 |

[1]Phr relates to "parts per hundred of rubber"

The results of the assays on the hot-melt adhesives prepared with the Piccolyte HM-106 resin are shown in Table 8. For each family of adhesives, the trends observed in the Brookfield viscosities at 160° C. and 180° C. are similar, irrespective of the measurement temperature. The viscosities of the adhesives containing the medium vinyl polymers and the hydrogenated polymers were higher than those prepared with the non-hydrogenated high vinyl polymers. This is therefore derived from the nature of the polymer sample and reflects that an adhesive prepared with a high vinyl polymer has viscosities lower than another which contains a medium vinyl polymer of the same composition and molecular weight. On the other hand, the vinyl levels of the non-hydrogenated polymers did not influence the adhesive softening temperature, which was higher for the adhesives prepared with hydrogenated polymers.

TABLE 8

Results of the assays of hot-melt adhesives prepared with Piccolyte HM-106 resin.

| Ex. | Sample | Pol. type | Brookfield viscosity at 160° C., cP | Brookfield viscosity at 180° C., cP | Softening temperature, ° C. | Probe Tack, g | Saft, s |
|---|---|---|---|---|---|---|---|
| 4 | S9618 C01 | SBS-r-medium vinyl | 3625 | 1800 | 94.2 | 1068 | 122 |
| 5 | H9618 18 | RO-SBS-r medium vinyl | 5730 | 3850 | 81.3 | 1702 | 60 |
| 6 | H9618 18 dep | HO-SBS-r medium vinyl | 6530 | 3920 | 88.7 | 1723 | 426 |
| 7 | H9618-17 | SBS-r high vinyl | 2695 | 1530 | 82.9 | 681 | 191 |
| 8 | H9618-10 | RO-SBS-r high vinyl | 1600 | 905 | 78.7 | 1290 | 131 |
| 9 | H9618-09 dep | HO-SBS-r high vinyl | 1395 | 837 | 86.6 | 1348 | 227 |
| 10 | H9618-11 | SEBS-r high vinyl | 16600 | 6500 | 119 | 602 | 1050 |
| 11 | H9618-15 | RO-SEBS-r high vinyl | 2270 | 1120 | 97.7 | 934 | — |
| 12 | H9618-06 dep | HO-SEBS-r high vinyl | 7450 | 2860 | 120 | 932 | 1995 |

The probe tack of the adhesives prepared with the non-hydrogenated polymers shows a trend similar to that of those prepared with the hydrogenated polymers. The adhesives which contain the protected or deprotected functionalized polymers show very similar tack values, always higher than those prepared with the non-functionalized polymers, 1.6 times higher in the case of non-hydrogenated medium vinyl polymers, double in the case of those prepared with the non-hydrogenated high vinyl rubbers, and 1.5 times higher in the case of those made with hydrogenated rubbers. It is also observed that an increase in the vinyl level leads to decreased tack.

In the case of SAFT, adhesives made with other hydrogenated rubbers show greater resistance to shear over time than those prepared with non-hydrogenated rubbers. The SAFT results indicate that the adhesives containing the functionalized multi-arm polymers show greater resistance to shear over time than those containing the non-functionalized multi-arm rubbers.

The invention claimed is:

1. A functionalized multi-arm polymer which comprises the reaction product of:
   (a) a coupling agent with a number of functional groups from 1 to 30 that is an oligomer that is obtained by free radical polymerization of:
      (i) at least one first monomer selected from the group consisting of alkenyl aromatic monomers, epoxy-functional acrylic monomers, and mixtures thereof; and
      (ii) at least one second monomer selected from the group consisting of alkenyl aromatic monomers, epoxy-functional acrylic monomers, anhydride-functional acrylic monomers, ester-functional acrylic monomers, carboxylic acid-functional acrylic monomers, and mixtures thereof;
      wherein the coupling agent has a number average molecular weight of from 1,000 to 10,000 g/mol, and a weight average molecular weight of from 1,500 to 20,000 g/mo,
      wherein the first monomer and the second monomer are not the same monomer;
   (b) and a polymer synthesized by anionic polymerization, wherein the polymer synthesized by anionic polymerization is of formula (I): Li-$Q_n$-Z—O—P where Q are alkenyl aromatic monomers, of conjugated diene or mixtures of them anionically polymerized from Li—Z; Z is a branched or non-branched hydrocarbyl connector group of from 3 to 25 carbon atoms; P is a protecting group; n is the number of units of diene monomer, alkenyl aromatic monomer, or of any of their anionically polymerized blends, to produce a protected functionalized multi-arm polymer, wherein the protected functionalized multi-arm polymer is subsequently hydrolyzed to remove the protecting groups to produce the functionalized multi-arm polymer comprising hydroxyl groups;
   and wherein at least 85% of the unsaturated groups in the functionalized multi-arm polymer are hydrogenated.

2. The functionalized multi-arm polymer according to claim 1, wherein the functionalized multi-arm polymer contains from 1 to 30 chains of the polymer synthesized by anionic polymerization covalently bonded to the coupling agent.

3. The functionalized multi-arm polymer according to claim 1, wherein the polymer synthesized by anionic polymerization is prepared from alkenyl aromatic monomers, conjugated diene monomers or mixtures of them.

4. The functionalized multi-arm polymer according to claim 3, wherein the polymer synthesized by anionic polymerization comprises at least one polymer selected from the group that consists of polystyrene, polybutadiene, polyisoprene and random copolymers, in block or tapered prepared from monomers selected from the group that consists of styrene, butadiene and isoprene.

5. The functionalized multi-arm polymer according to claim 1, wherein the polymer synthesized by anionic polymerization has an average molecular weight at the peak of the distribution of 3,000 to 300,000 g/mol.

6. The functionalized multi-arm polymer according to claim 1, wherein the polymer synthesized by anionic polymerization is polymerized from conjugated diene monomers and has a content of 8 to 80% molar of 1,2 structures.

7. The functionalized multi-arm polymer according to claim 1, wherein the polymer synthesized by anionic polymerization has a percentage of coupled chains from 2 to 90% by weight.

8. The functionalized multi-arm polymer according to claim 1, wherein the polymer synthesized by anionic polymerization has an average molecular weight at the peak of the distribution of 20,000 to 500,000 g/mol.

9. The functionalized multi-arm polymer according to claim 1, wherein the functionalized multi-arm polymer has an average molecular weight at the peak of the distribution of 5,000 to 2,000,000 g/mol.

10. A method for the preparation of the polymers of claim 1, which comprises reacting the polymer synthesized by anionic polymerization with the coupling agent, wherein the coupling agent reacts with the polymer synthesized by anionic polymerization in the same reaction place where the polymer synthesized by anionic polymerization is obtained.

11. A method for the preparation of a hydrogenated multi-arm polymer of claim 1, wherein the method comprises hydrogenating the functionalized multi-arm polymers at a temperature between 25 and 150° C. prior to removal of the protective groups.

12. An adhesive composition which contains the functionalized multi-arm polymer according to claim 1, wherein the reaction product contains from 0.001 to 5% by weight of coupling agent based on the total quantity of coupling agent and polymer synthesized by anionic polymerization, wherein the coupling agent reacts with the polymer synthesized by anionic polymerization in the same reaction place where the polymer synthesized by anionic polymerization is obtained.

13. The adhesive composition according to claim 12, which further comprises 15 to 30% by weight of tackifying resin, from 15 to 30 percent by weight of plasticizer and from 0.05 to 2 percent by weight of antioxidant.

14. A reinforced material which comprises the functionalized multi-arm polymer according to claim 1, wherein the material that is to be reinforced is selected from the group that consists of asphalts, plastics and tires.

15. An article produced from the reinforced material of claim 14.

16. A modified asphalt which comprises asphalts mixed with the functionalized multi-arm polymer according to claim 1, wherein the modified asphalt contains from 1 to 25% by weight of the functionalized multi-arm polymer.

17. A modified plastic comprising the functionalized multi-arm polymer as defined in claim 1, wherein the modified plastic contains from 1 to 40 percent by weight of functionalized multi-arm polymer, based on the total weight of the functionalized multi-arm polymer and the plastic.

18. The modified plastic according to claim 17, wherein the plastic is selected from the group consisting of polyamides, polyurethanes, polyethers, polysulfones, polyether ketones, polyether ether ketones, polyimides, polyetherimides, polycarbonates, polyesters, polystyrene and copolymers thereof.

19. The functionalized multi-arm polymer of claim 1, wherein the coupling agent has a number of functional groups of from 5 to 20.

20. The functionalized multi-arm polymer of claim 1, wherein the polymer synthesized by anionic polymerization is prepared from alkenyl aromatic monomers and conjugated diene monomers in a molar proportion of alkenyl aromatic monomer to conjugated diene monomer of 0.05 to 1.0.

21. The functionalized multi-arm polymer of claim 1, wherein the polymer synthesized by anionic polymerization has an average molecular weight at the peak of the distribution of 20,000 to 300,000 g/mol.

22. The functionalized multi-arm polymer of claim 1, wherein at least 90% of the unsaturated groups in the functionalized multi-arm polymer are hydrogenated.

23. The functionalized multi-arm polymer of claim 1, wherein at least 99% of the unsaturated groups in the functionalized multi-arm polymer are hydrogenated.

24. The functionalized multi-arm polymer of claim 1, wherein the protective group P is $(A-R^1R^2R^3)$, wherein A is carbon (C) or silicon (Si); $R^1$, $R^2$, $R^3$ are independently selected from the group consisting of hydrogen, an alkyl group, an alkyl group substituted with $C_1$-$C_5$ alkyl, $C_1$-$C_5$ thioalkyl, or $C_1$-$C_5$ dialkylamine, an aryl group, an aryl group substituted with $C_1$-$C_5$ alkyl, $C_1$-$C_5$ thioalkyl, or $C_1$-$C_5$ dialkylamine, a cycloalkyl group between 5 and 12 carbon atoms, or a cycloalkyl group between 5 and 12 carbon atoms substituted with $C_1$-$C_5$ alkyl, $C_1$-$C_5$ thioalkyl, or $C_1$-$C_5$ dialkylamine.

* * * * *